Oct. 25, 1955   A. M. MARKS ET AL   2,721,809
METHOD FOR THE UNIFORM COATING OF LARGE SURFACES
Filed Sept. 10, 1952   3 Sheets-Sheet 1
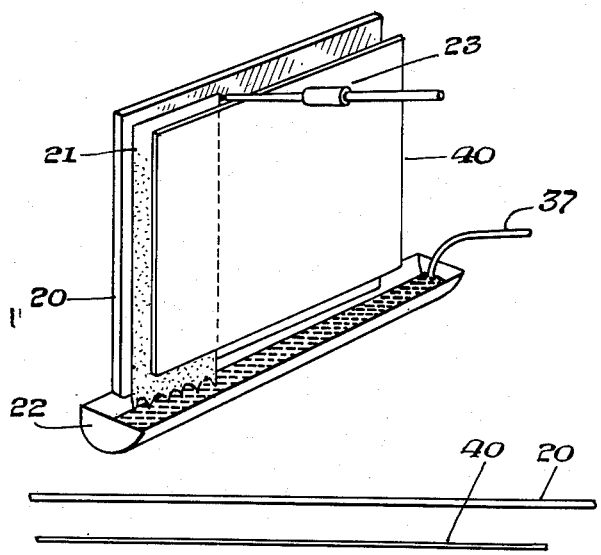
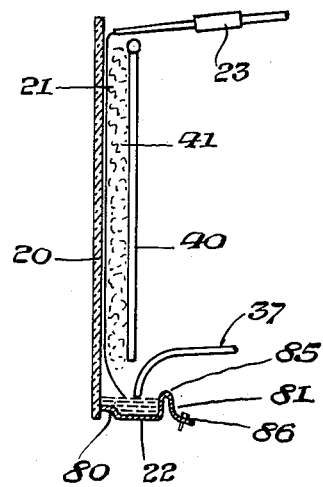
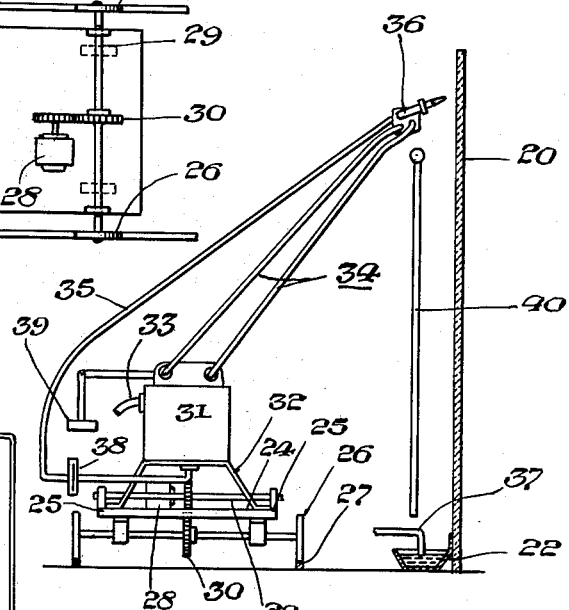
Inventors,
Alvin M. Marks.
Mortimer M. Marks
by their Attorney
Albert F. Kronman

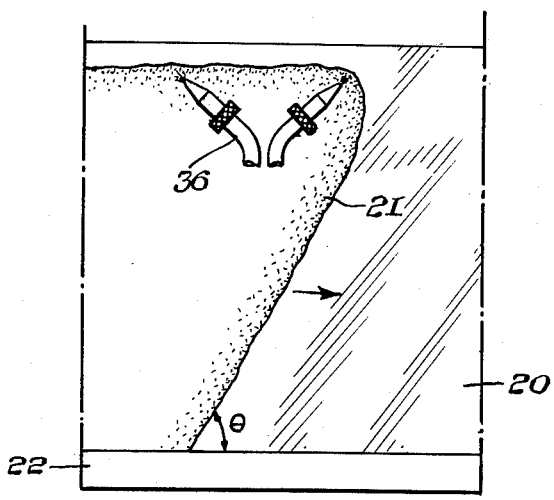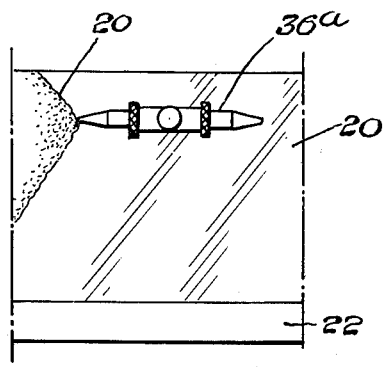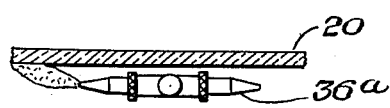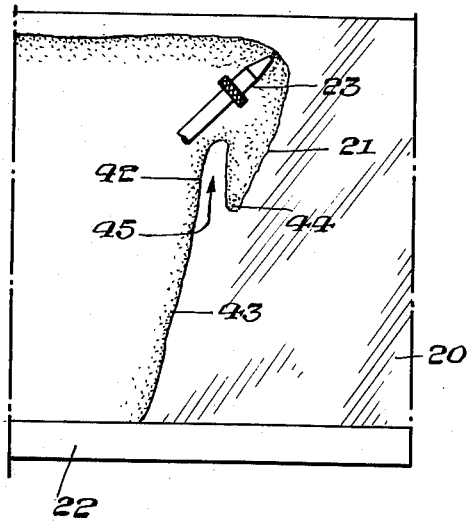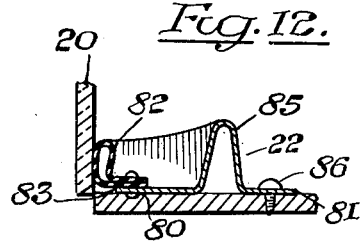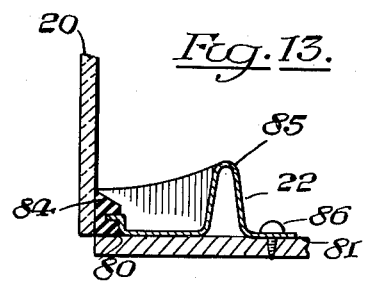

Oct. 25, 1955  A. M. MARKS ET AL  2,721,809
METHOD FOR THE UNIFORM COATING OF LARGE SURFACES
Filed Sept. 10, 1952  3 Sheets-Sheet 3
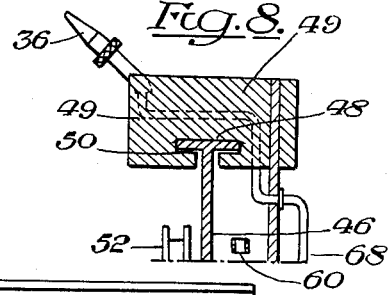
Fig. 7.
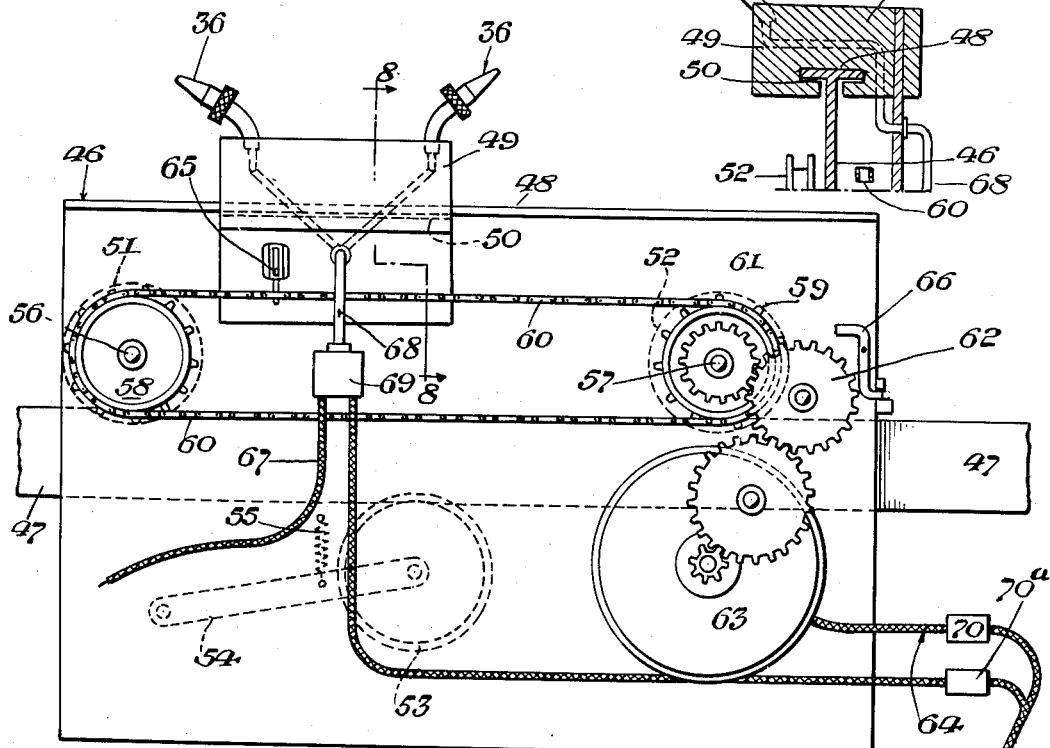
Fig. 8.
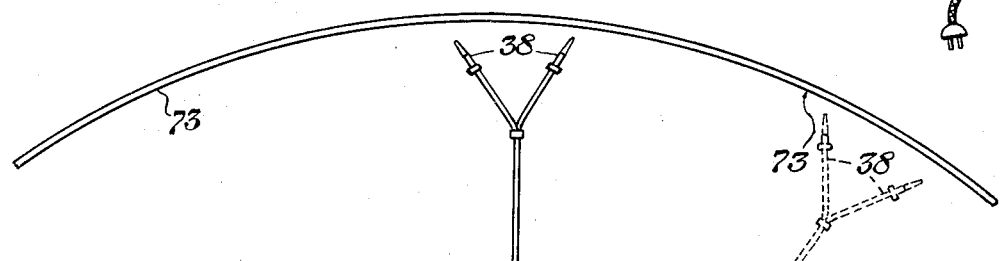
Fig. 9.
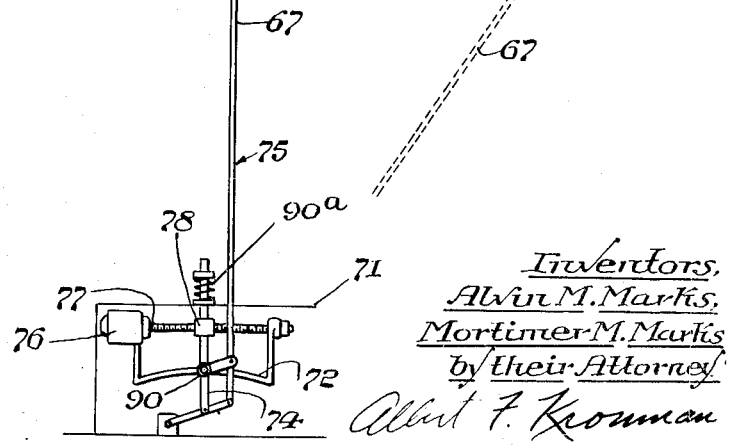
Inventors,
Alvin M. Marks,
Mortimer M. Marks,
by their Attorney
Albert F. Kronman

United States Patent Office 2,721,809
Patented Oct. 25, 1955

2,721,809

METHOD FOR THE UNIFORM COATING OF LARGE SURFACES

Alvin M. Marks and Mortimer M. Marks, Beechhurst, N. Y.

Application September 10, 1952, Serial No. 308,752

5 Claims. (Cl. 117—33.3)

This invention relates to the method and apparatus for the uniform coating of the surfaces of large areas, and more particularly to the coating of large windows.

In the coating of large areas, such as windows, with protective light filtering media, which media are in the nature of viscous fluids at the time of their application to the window, a large number of problems are encountered which render presently known methods such as spraying, painting, brushing, rolling and the like, highly unsatisfactory. In spraying, particularly in enclosed spaces such as may be found in store windows, or in small rooms, the fumes produced by the vaporized suspended solid material fill the said areas with a resultant discomfort to the operator, and often cause damage to the surrounding materials, such as furniture, merchandise, draperies, and the like.

Another deficiency of employing the spraying method is that it produces a coating which is uneven upon the surface of the glass. The unevenness is caused by the spray patterns which are difficult to control, and the inexact movement of the spray gun in the hands of an operator. The motion of the spray gun will also produce variations in the thickness of the coating, which is extremely noticeable on large transparent plates of glass.

In spraying, particularly with viscous materials containing solvents, there is a tendency on the part of the spraying material to solidify within the nozzle, causing the said nozzle to become clogged. It thus becomes almost impossible to coat an extremely large area by spraying in a single operation. The fluctuations caused by the spraying operation produces an effect known in the art as "orange peel." This defect is also brought about by a certain amount of run or flow of the coating material, following the spraying operation. In order to eliminate as much run as possible, only a thin coating of material may be applied by spraying in a single operation. Double spraying to obtain a desired thickness necessary for light filtering results in poor optical transmission, due to the fact that the "orange peel" effect is heightened by the second spraying.

Where roller coating has been tried it has been found impractical because it produces narrow strips of coating material, requiring seams or overlapping for the purpose of covering large surfaces. The same difficulty has been found with knifing processes.

An additional hazard encountered where spraying has been used is that of a possible explosion or fire, due to the large amount of volatile material which is present in the air during the spraying operation. With the flow method hereinafter described, slower evaporating solvents, having higher flash points may be used, with a substantial increase in safety.

Where the transparency of a finished coating is extremely important, such as in the case of store windows, where merchandise is displayed, spraying and similar methods have also failed to produce satisfactory results.

Accordingly, it is an object of the present invention to provide a coating method and device which will eliminate presently known difficulties, and produce a result vastly superior to anything presently known in the art.

Another object of the present invention is to provide a device which may be used by unskilled operators, with highly satisfactory results.

A further object of the present invention is to provide a method of coating large glass areas with a uniform and highly transparent covering.

A further object of the present invention is to prevent foreign matter from becoming embedded in the protective coating during the application thereof.

Another object of the present invention is to provide a novel trough structure using the window as one wall thereof.

A feature of the present invention is the provision of a traveling coating nozzle which will apply material over the entire surface at a controlled flow and space rate.

Another feature of the present invention is the recovery of excess material and the reuse of said material after it has flowed from the surface to which said material is being applied.

The invention consists of the construction, combination and arrangement of parts, as herein illustrated, described and claimed.

In the accompanying drawings, forming part hereof, are illustrated three forms of embodiment of the invention, in which drawings similar reference characters designate corresponding parts, and in which:

Figure 1 is a somewhat diagrammatic view in perspective showing the method of coating large surfaces in accordance with the present invention.

Figure 2 is a view in vertical section of a surface being coated in accordance with the present invention showing the vapor barrier and trough construction.

Figure 3 is a somewhat diagrammatic top plan view of a surface coating machine made in accordance with the present invention.

Figure 4 is a view in side elevation of the machine shown in Figure 3.

Figure 5 is a front elevational view of a surface being coated in accordance with the present invention.

Figure 6 is a view similar to Figure 5 illustrating the result of improper coating procedures.

Figure 7 is a view in front elevation of a second embodiment of a coating machine made in accordance with the present invention.

Figure 8 is a fragmentary view in vertical section of the nozzle block shown in Figure 7.

Figure 9 is a top plan view of a third embodiment of a coating machine made in accordance with the present invention.

Figure 10 is a view in front elevation showing an alternate nozzle mounting structure.

Figure 11 is a top plan view of the nozzle shown in Figure 10.

Figure 12 is a view in vertical section of a fluid receiving trough applied to a window, made in accordance with the present invention.

Figure 13 is a view in vertical section of a second embodiment of a fluid receiving trough applied to a window, made in accordance with the present invention.

Figure 14 is a somewhat diagrammatic view of the fluid handling equipment required for the operation of coating devices in accordance with the present invention.

Referring to the drawings, and specifically Figures 1 and 2, there is shown a somewhat diagrammatic view of a window 20, to which a coating of some suitable light filtering media 21 is being applied. A trough 22 is placed at the bottom of the window 20, for the purpose of receiving the excess coating material 21 as it flows from the said window 20.

The trough 22, best shown in Figures 12 and 13, may consist of a length of liquid impervious material such as fiberboard or metal having a leading edge 80 thereon and a nailing edge 81. The leading edge is adapted to receive a resilient strip 82 which strip may be in the nature of a hollow tube 83, as shown in Figure 12, or a solid molding 84, as shown in Figure 13. Alternately, a solvent impervious tape (not shown) may be used to seal the space between the trough 22 and the window 20. The metal of the trough 22 is bent, as indicated at 85, to form an upstanding wall having the leading edge 80 and the nailing strip 81 extending therefrom in opposite horizontal directions and is closed at both ends.

The trough is applied by forcing the resilient sealing members 82, 84 against the window 20 and compressing the bent portion 85 of the trough so as to force the leading edge 80 of the trough to compress the resilient members. A nail or similar fastening device 86 is then driven through the nailing edge 81 of the trough into the floor, or other support upon which it is disposed, to hold the trough in place.

It will be seen from an examination of Figures 12 and 13 that there is now provided a trough, one wall of which comprises the window 20 or surface to be covered and the other wall of which is formed from the bent portion 85 of the trough material. In this manner, when the fluid flows down the window 20, it fills the space between the window and the upstanding portion of the trough 22. Thereafter, the coating material is drawn from the trough by means of the suction pipe 37 resulting in a continuous coating of the window from top to substantially the very bottom.

The structure of the trough as described above is particularly important where store windows are to be coated, inasmuch as these windows are made so that the glass reaches to the display surface or floor of the display area.

A fluid dispensing nozzle 23 directed at the upper portion of the window 20 is slowly moved from the lefthand corner to the righthand corner of the window 20. The fluid dispensing nozzle 23 may be manually moved across the top of the surface to be coated by an operator. However, the operator must be skilled in the manipulation of the nozzle so as to perform the traverse at a controlled rate, maintaining a suitable distance of the nozzle from the window and allowing the fluid emanating from the nozzle to flow down the entire height of the window at the beginning and end of the traverse so as to insure the coating of the entire area.

While the process has been successfully practiced manually, the mechanical methods hereinafter described have proved to be more satisfactory in that they produce even finer results from the standpoint of uniformity of coating and transparency of final result.

As the nozzle 23 travels its course, the coating material 21 which is applied thereby, flows downwardly under the force of gravity and creates a uniform film over the entire surface. It is to be understood that the coating material 21 contains volatiles which evaporate during the flow process, thereby causing a film to remain deposited on the glass 20.

Referring to Figures 3 and 4, there is shown one form of coating carriage made in accordance with the present invention. The carriage 24 consists of a platform 25 having wheels 26 attached thereto, which wheels may be supported upon tracks 27 or any suitable level surface. The carriage 24 is propelled by a small electric motor 28 or other suitable mover, which motor is coupled to the axle 29 of one set of wheels 26 by means of gears 30, or the like. The motor 28 is specifically selected and is adapted to produce a uniform motion of the carriage 24 throughout its travel.

A tank 31 is mounted upon the platform 25 of the carriage 24 by brackets 32. The tank 31 is filled with a suitable amount of the coating media which is to be applied to the window 20. The tank 31 is supplied with air pressure by means of a flexible hose 33, best shown in Figure 3, attached to a compressor (not shown). The air pressure, when applied to the tank forces the fluid therein up through a pipe 35.

An adjustable boom 34 is carried upon the top of the tank 31, which boom 34 supports the pipe 35 through which the coating material may pass. The pipe 35 terminates in a single or multiple nozzle 36, at the upper end thereof, which nozzles are directed at the surface to be coated. Where two nozzles 36 are employed, as shown in Figure 3, the second column of liquid flowing down the window being coated, acts to stabilize and make more uniform the coating operation.

A plurality of jets also makes it possible to advance the coating operation at a greater speed. The surplus coating material from the window 20 which flows into the trough 22 is sucked up by means of a hose 37 which is connected to a suction pump 91, Fig. 14. The suction pump returns the coating fluid to a tank 92. A suitable filter 38 is incorporated within the pipe 35 to eliminate any foreign particles from the coating material before it is flowed upon the window 20. Where a boom 34, such as is shown in Figures 3 and 4 is employed, it may also be necessary to employ a counterbalance 39 to maintain the right adjustment of the boom throughout the travel of the carriage.

In performing the coating operation with the above described apparatus, the air pressure is applied to the hose 33, and the motor 28 caused to propel the carriage. As the carriage traverses the area to be covered, the fluid emanating from the nozzles 36 flows downwardly over the said area, to provide a uniform covering. When the carriage has made a complete traverse, and the nozzles 36 have traveled from one side of the window 20 to the other, a suitable switch (not shown) is operated to stop the carriage and cut off the flow of the fluid through the nozzles 36.

In many cases where there is ambient foreign material carried in the air, or where the temperature and atmospheric conditions would accelerate drying to an unsatisfactory point, it is necesary to employ a vapor barrier 40, such as is shown in Figures 1, 2, 3 and 4. The vapor barrier 40 may be a curtain of low permeability to the volatiles contained in the coating material, such that the evaporation speed of said volatiles is reduced. An area of high solvent vapor concentration, indicated at 41 in Figure 2, is established between the curtain 40 and the window 20. This area 41 permits the coating 21 to even out along its entire length during its flow; prevents its rapid drying; enables the film to dry with a uniform flat surface, and reduces the tendency for dust particles and the like to become lodged within the coating. The vapor barrier 40 may sometimes be allowed to remain in place, for a short period of time, following the coating operation, until the film 21 has ceased to flow.

It is within the purview of the present invention to employ a high proportion of high boiling solvents to the lacquer coating material, so as to alter the rate of evaporation. Where high boiling solvents are used, the curtain 40 may be eliminated, although its use may be found worth while in producing extremely uniform and clean coatings.

The desirability for a plurality of nozzles 36, such as are shown in Figure 3, is best illustrated by the enlarged fragmentary view of Figure 5.

The window or glass surface 20 presents a flat surface against which the jets from nozzles 36 are directed. The stream of the coating material 21, which is directed at the window 20, moves downward and to the right at an angle $\theta$ in the horizontal direction, shown by the arrow in Figure 5.

When the jets move from left to right at a slow velocity, the angle $\theta$ is nearly 90°, and much excess material may be used in coating. As the velocity of the jets 36 from left to right is increased, the angle $\theta$ decreases, and coating is achieved with less excess run-off. The angle of the stream of coating material 21 will also depend upon the viscosity of the material applied, as well as the speed of travel of the nozzles 36.

Referring to Figure 6, there is shown the result of an excessive travel speed of the nozzle and the use of only a single nozzle 23. The stream of coating fluid 21 tends to separate or break as indicated at 42, forming two downwardly moving streams 43 and 44, with an open area 45 therebetween. If the motion of the nozzle 23 is too fast or if the flow from the nozzle is insufficient, or if the coating upon the window is permitted to evaporate too rapidly and so to dry quickly, the area 45 remains uncovered and the coating is breached at that point. It is therefore apparent that the rate of travel, and the viscosity of the material, applied to the window and the amount of flow coming from the jets, are highly important, and that their control is necessary to produce satisfactory results. Thus, for example, suitable results may be obtained by using jets having an orifice of .080" and a coating material having a percentage of solids varying between ten and twenty-two percent and a maximum viscosity at the latter solid content of approximately twenty-five seconds with a #4 Ford cup.

In an alternate form of nozzle 36a, shown in Figures 10 and 11, the nozzle jet is single but directed along the window surface, either forward or rearward to the direction of nozzle travel, and disposed in a horizontal direction. This form has the effect of multiple nozzles in producing a spread of liquid forming a wide flow strip at the leading edge.

Referring to Figures 7 and 8, there is shown a second embodiment of the present invention, in which the coating car 46 travels upon an elevated rail 47, which rail is held near the top of the surface to be coated, by means of upright members (not shown).

The car 46, which is in the form of a flat plate, has a horizontal member 48 at the top thereof, which horizontal member forms a T at that point. A nozzle block 49 is carried upon the top of the car 46, and is provided with a T shaped slot 50, which slot receives therein the horizontal member 48, of the car 46.

The car 46 is provided with grooved wheels 51 and 52, which wheels are adapted to ride upon the track 47.

A third wheel 53 is carried on the end of an arm 54, which arm is spring loaded in an upward direction by means of a coil spring 55. The wheel 53 is grooved and engages the underside of the track 47, providing a positive hold upon the track 47 for the car 46. The car 46 may be removed from the track merely by depressing the arm 54 so as to free the wheel 53 from the track 47.

The grooved wheels 51 and 52 are secured upon the window side of shafts 56, 57, upon the opposite ends of which shafts there are mounted sprockets 58, 59 linked by an endless chain 60, so as to couple wheels 52 and the sprockets. The shaft 57 upon which is mounted the wheel 52 and the sprocket 59 also carries a gear 61. The gear 61 is in mesh with a gear train 62 which connects it to a motor 63. The motor 63 is mounted upon the front of the car 46. The motor 63 is supplied with energy from the electrical line 64 which in turn is connected to a suitable source of electrical potential (not shown). It will be seen that when current is supplied to the motor 63 it will drive the car 46 along the track 47 through the gear train 62, causing the sprocket and chain 60 to turn the grooved wheel 52.

In order that the nozzles 36 may travel the full distance from the extreme left to the extreme right of the surface to be coated, it has been found desirable to provide a traveling nozzle block 49 upon which the nozzles 36 are mounted. The travel of the nozzle block 49 is across the T-shaped upper edge of the car 46. The motion of the block 49 is imparted to it by means of a pin 65, which is slidably and vertically mounted upon the block 49. The pin 65 engages the endless chain 60, so that the motion of the chain pulls the nozzle block 49 along the upper edge of the car 46. When the pin 65 reaches a point directly over the sprocket 59, it will be thrown out of the chain 60, and the lateral motion of the block 49 will thereupon cease.

Latch means, generally indicated at 66, are provided at the righthand side of the car 46, for the purpose of holding the grooved wheel 52 clear of the track 47 until the nozzle block 49 has made the complete traverse of the upper edge of the car 46. As the nozzle block 49 finishes its travel, it releases the latch means 62, which thereupon drops the grooved wheel 52 upon the track 47, with the result that the entire car 46 is placed in motion, driven by the said wheel 52.

The disposition of the nozzles 36 within the nozzle block 49 is such that when the mechanism is started, the jet of fluid from the lefthand nozzle will reach the lefthand corner of the surface to be coated, and the jet of fluid from the righthand nozzle will have reached the righthand of the surface to be coated at the conclusion of the travel of the block 49 and the car 46.

The coating fluid is fed into the nozzle block 49 by means of a hose 67, which in turn is connected to suitable bores 68 within the block 49. As previously described in connection with Figures 3 and 4, the hose 67 is attached to the outlet of a tank (not shown), which tank carries the coating fluid.

An electrically operated valve 69 is interposed between the hose 67 and the block 49, for the purpose of controlling the flow of the fluids. Switch means 70a are employed to control the operation of the valve 69. It has been found desirable to allow the fluid, emanating from the lefthand nozzle 36 in Figure 7, to flow down the entire window or surface to be coated, into the trough 22, before the nozzle block 49 is set in motion. Thus, the motor controlling switch 70 is not thrown until the fluid reaches the trough 22. In a corresponding manner, following the traverse of the car 46, the switch 70 is employed to halt the motion of the car, but the fluid issuing from the righthand nozzle 36 is permitted to continue until the fluid has completely covered the entire righthand edge of the surface to be coated. It will be apparent that the entire window or surface to be covered, may be treated by the apparatus and the method described above.

It is often necessary to coat windows or other surfaces which do not represent a plane surface. Thus, for example, the user may wish to coat a curved window, or one of irregular shape. The device, somewhat diagrammatically shown in Figure 9, is adapted to perform this function.

A mounting base 71 in the embodiment shown in Figure 9, is provided with a template 72, which corresponds in shape to the surface to be coated 73.

Suitable linkage 74, which comprises a pantograph device, is employed at this point, to couple a boom 75 to the template 72. A motor 76 is connected to a worm 77 upon which is threadably carried a nut 78. The spring 90a pulls and holds the joint 90, upon which is mounted a roller of the pantograph linkage, against the template 72.

The supply of coating fluid previously described is led to the boom 75 to which is secured a pipe 67 connected to the nozzles 38. When the coating fluid is pumped through the pipe 67 and the motor 76 started, the nozzles mounted on the boom 75 will describe a path identical to the shape of the guide 72 and parallel to the surface to be coated 73. The spaced disposition of the nozzles 38, here again, enables the coating device to cover the surface from one side to the other, and from the top to the bottom by reason of the flow of the said fluid.

Referring to Figure 14, there is shown the diagram of a suitable fluid handling structure required for the operation of the present coating devices. The coating material 21 which flows down the surface of the area to be covered 20 is collected in the trough 22 from which it is sucked through the pipe 37 into the tank 92. A suction pump 91 operated by a motor 93 serves to draw the fluid into the tank 92. The fluid leaves the tank 92 by way of a pipe 96 in the bottom thereof and is pulled therethrough by a gear pump 95 operated by motor 94.

A filter 38 is interposed in the line 35 for the purpose of removing from the fluid any foreign material that may have been picked up during the flowing portion of the operation. The pump 95 forces the fluid into the supply tank 31 from which it is expelled by the operation of the pump 97 acting through the air pressure line 98. The fluid thus appears at the nozzle 23 and is redirected at the surface to be coated. The air pump 97 may also be activated by the motor 93, or by a separate motor (not shown).

In any of the above devices the nozzles 36 may be supported a given distance from the window surface by providing guide fingers or rollers secured to the nozzles which in turn bear against the window.

From the foregoing, it will be seen that there has been provided an apparatus and method for coating large surfaces with a uniform film of material, which material is flowed upon the surface from nozzles traversing the topmost edge of the surface to be covered.

Having thus fullly described the invention, what is claimed as new and sought to be secured by Letters Patent of the United States, is:

1. The method of coating large vertically disposed areas with light filtering media which consists of the steps of preparing a supply of a viscous solution containing the filtering media, forming a film of said solution on a vertically extending portion of the area, directing a stream of said solution at an area contiguous with said vertical portion and adjacent the upper edge of the surface to be coated, thereafter traversing the upper portion only of the surface with said stream so as to apply, at a rate which will provide a downwardly flowing film having an unbroken leading edge, a quantity of solution thereto in excess of that needed to cover the surface, allowing the solution so applied to flow downwardly across the entire surface in a continuous sheet and thereafter allowing that portion of the fluid which adheres to the surface to dry thereon.

2. The method of coating large vertically disposed areas with light filtering media which consists of the steps of preparing a supply of a viscous solution containing the filtering media, forming a film of said solution on a vertically extending portion of the area by directing a stream of said solution at an area adjacent the upper edge of the surface to be coated until the solution has flowed vertically to the bottom of the area to be coated, thereafter directing a stream of said solution at an area contiguous with said vertical portion and adjacent the upper edge of the surface to be coated, thereafter traversing the upper portion only of the surface with said stream so as to apply, at a rate which will provide a downwardly flowing film having an unbroken leading edge, a quantity of solution thereto in excess of that needed to cover the surface, allowing the solution so applied to flow downwardly across the entire surface in a continuous sheet and thereafter allowing that portion of the fluid which adheres to the surface to dry thereon.

3. The method of coating large vertically disposed areas with light filtering media which consists of the steps of preparing a supply of a viscous solution containing the filtering media, forming a film of said solution on a vertically extending portion of the area, directing a stream of said solution at an area contiguous with said vertical portion and adjacent the upper edge of the surface to be coated, thereafter traversing the upper portion only of the surface with said stream so as to apply, at a rate which will provide a downwardly flowing film having an unbroken leading edge, a quantity of solution thereto in excess of that needed to cover the surface, allowing the solution so applied to flow downwardly across the entire surface in a continuous sheet, maintaining an area of high solvent vapor concentration against the flowing solution by confining the vapor coming from said solution to a region adjacent thereto, and thereafter allowing that portion of the fluid which adheres to the surface to dry thereon.

4. The method of coating large vertically disposed areas with light filtering media which consists of the steps of preparing a supply of a viscous solution containing the filtering media, forming a film of said solution on a vertically extending portion of the area, directing a stream of said solution at an area contiguous with said vertical portion and adjacent the upper edge of the surface to be coated, thereafter traversing the upper portion only of the surface with said stream so as to apply, at a rate which will provide a downwardly flowing film having an unbroken leading edge, a quantity of solution thereto in excess of that needed to cover the surface, allowing the solution so applied to flow downwardly across the entire surface in a continuous sheet and collecting at the bottom of the coated area that portion of the fluid which has not become deposited thereon, and thereafter allowing that portion of the fluid which adheres to the surface to dry thereon.

5. The method of coating large vertically disposed areas with light filtering media which consists of the steps of preparing a supply of a viscous solution containing the filtering media, forming a film of said solution on a vertically extending portion of the area, directing a stream of said solution at an area contiguous with said vertical portion and adjacent the upper edge of the surface to be coated, thereafter traversing the upper portion only of the surface with said stream so as to apply, at a rate which will provide a downwardly flowing film having an unbroken leading edge, a quantity of solution thereto in excess of that needed to cover the surface, allowing the solution so applied to flow downwardly across the entire surface in a continuous sheet and thereafter slowly evaporating the solution to dryness while the excess is flowing off.

References Cited in the file of this patent

UNITED STATES PATENTS

| Number | Name | Date |
| --- | --- | --- |
| 667,369 | Redman | Feb. 5, 1901 |
| 1,339,400 | Lander | May 11, 1920 |
| 1,416,929 | Bailey | May 23, 1922 |
| 1,696,185 | Aulson | Dec. 25, 1928 |
| 2,081,742 | Glaze | May 25, 1937 |
| 2,212,576 | Teodonno | Aug. 27, 1940 |
| 2,346,101 | Bright | Apr. 4, 1944 |